United States Patent
Beyer et al.

(10) Patent No.: US 9,121,745 B2
(45) Date of Patent: Sep. 1, 2015

(54) MULTICHAMBER ULTRASONIC SENSOR FOR DETERMINING A LIQUID LEVEL

(75) Inventors: Oliver Beyer, Erlangen (DE); Henning Grotevent, Nuremberg (DE); Bernd Harigel, Zell unter Aichelberg (DE); Manfred Roth, Grosshabersdorf (DE); Gerd Unverzagt, Nuremberg (DE); Andreas Weibert, Nuremberg (DE)

(73) Assignee: Conti Temic microelectronic GmbH, Nuremberg (DE)

( * ) Notice: Subject to any disclaimer, the term of this patent is extended or adjusted under 35 U.S.C. 154(b) by 336 days.

(21) Appl. No.: 13/366,716

(22) Filed: Feb. 6, 2012

(65) Prior Publication Data

US 2012/0152015 A1 Jun. 21, 2012

Related U.S. Application Data

(62) Division of application No. 12/309,432, filed as application No. PCT/DE2007/001287 on Jul. 18, 2007, now abandoned.

(30) Foreign Application Priority Data

Jul. 18, 2006 (DE) .......................... 10 2006 033 592
Aug. 25, 2006 (DE) .......................... 10 2006 039 872

(51) Int. Cl.
*G01F 23/28* (2006.01)
*G01F 23/296* (2006.01)

(52) U.S. Cl.
CPC .......... *G01F 23/296* (2013.01); *G01F 23/2962* (2013.01)

(58) Field of Classification Search
CPC . G01F 23/2962; G01F 23/284; G01F 23/296; G01F 23/2967; G01F 23/2961
USPC ........................................ 73/290 V
See application file for complete search history.

(56) References Cited

U.S. PATENT DOCUMENTS

| 5,378,125 A | 1/1995 | Frank et al. |
| 5,456,108 A * | 10/1995 | Birkett ........................ 73/290 V |

(Continued)

FOREIGN PATENT DOCUMENTS

| DE | 33 30 059 | 2/1985 |
| DE | 103 50 084 | 6/2005 |

(Continued)

OTHER PUBLICATIONS

International Search Report of the International Searching Authority for International Application PCT/DE2007/001287, mailed Dec. 5, 2007, 2 pages, European Patent Office, HV Rijswijk, Netherlands.

(Continued)

*Primary Examiner* — Hezron E Williams
*Assistant Examiner* — Rodney T Frank
(74) *Attorney, Agent, or Firm* — W. F. Fasse (57) ABSTRACT

An ultrasound sensor arrangement for determining a fluid level includes an elongated housing with a lid and a floor, and a measuring chamber in the housing, in which a fluid has the same level as the fluid outside the measuring chamber, and an ultrasound transmitter/receiver on the floor within or outside the housing in the area of the measuring chamber. Transmitted sound signals from the ultrasound transmitter/receiver reflect from the fluid surface and are received by the ultrasound transmitter/receiver to determine the fluid level from the signal transit time. At least one further chamber is arranged at least partially in front of or around the measuring chamber. The outermost chamber forms the inlet chamber. The several chambers are connected to each other for fluid flow.

20 Claims, 8 Drawing Sheets (56) References Cited

U.S. PATENT DOCUMENTS

| 6,427,532 B1 * | 8/2002 | Keller ........................ 73/290 V |
| 2005/0026301 A1 | 2/2005 | Petithory |
| 2005/0199294 A1 | 9/2005 | Vaitses |

FOREIGN PATENT DOCUMENTS

| EP | 0 653 611 | 5/1995 |
| EP | 1 081 470 | 3/2001 |

OTHER PUBLICATIONS

English translation of PCT International Preliminary Report on Patentability, for International Application PCT/DE2007/001287, mailed Feb. 19, 2009, 5 pages, International Bureau of WIPO, Geneva, Switzerland.

* cited by examiner

MULTICHAMBER ULTRASONIC SENSOR FOR DETERMINING A LIQUID LEVEL

CROSS-REFERENCE TO RELATED APPLICATION

This application is a Divisional and claims the benefit under 35 USC 120 and 121 of U.S. application Ser. No. 12/309,432 filed on Jan. 20, 2009, the entire disclosure of which is incorporated herein by reference.

FIELD OF THE INVENTION

The invention relates to an ultrasound sensor for determining a fluid level by evaluating an ultrasound signal reflected from a surface of the fluid.

BACKGROUND INFORMATION

Sensors of this type are used in automobile technology, for example, for measuring the level of engine oil or fuel. A sensor on the container floor emits ultrasound impulses. The echo from the fluid surface is reabsorbed by the transmission receiver. The filling level is proportionate to the sound run time. According to the German patent application DE 33 30 059 A1, the sound is guided through a hollow conduit or sound conducting tube which is arranged in a container. At the lower end of the sound conducting tube, the ultrasound transmission receiver is attached. The tube is positioned in the fluid and is filled with fluid via at least one offset opening until the filling level corresponds to that in the container. In the sound conducting tube, which can be curved, the filling level is measured using ultrasound. An embodiment of this type is primarily designed for measuring the filling level with irregularly formed fluid containers. A great disadvantage of this arrangement is that foam from the fluid to be determined can penetrate into the sound conducting tube and slightly falsify the determination of the fluid level.

The problem of foam formation with a sensor based on ultrasound to determine the fluid level lies, in particular with engine oil, in the fact that due to circulations in the oil while the engine is running, air bubbles of different sizes are created. These air bubbles have the property, depending on their size, of either scattering or reflecting the ultrasound signals. Under these circumstances, a sufficiently precise, error-free measurement cannot be guaranteed.

A previous approach to solve the problem by using a fine-mesh filter (mesh width approx. 60 μm) to keep the air bubbles outside of the measuring chamber, does not give a satisfactory result. The penetration of air bubbles is prevented by the filter, but this method fails as a result of the dirt particles and other impurities in the oil. Due to these particles, the filter becomes clogged after a very short time, so that it is no longer possible to equate the level in the measuring chamber with the level of oil in the engine that is to be determined. Thus, the operation of the sensor in the engine cannot be guaranteed for the entire operational life span.

Against this background, the object of the invention is to provide an ultrasound sensor of the type described in the introduction, which due to its geometric structure prevents air bubbles from penetrating into the measuring chamber, and which thus enables a permanent and reliable determination of the fluid level.

SUMMARY OF THE INVENTION

This object is attained according to the invention by an ultrasound sensor that includes special features disclosed and claimed herein, as follows.

In the housing of the sensor, in addition to the measuring chamber, at least one additional chamber is arranged at least partially in front of or at least partially around the measuring chamber, wherein the outer such additional chamber forms the inlet chamber, and the at least one additional chamber may further include at least one intermediate chamber between the inlet chamber and the measuring chamber. In order to enable the fluid from the inlet chamber to enter the measuring chamber, the chambers are flow-connected to each other.

The inlet chamber and the measuring chamber comprise on their side, preferably in each case at a height close to the floor of the housing, an opening to enable the fluid to flow in and out.

In order to make the route or flow path which the fluid travels from the inlet chamber into the measuring chamber, and thus the time during which air bubbles which are present can rise to the surface of the fluid, as long as possible, the opening into the inlet chamber and the opening into the measuring chamber are generally arranged radially as far apart from each other as possible.

The air which escapes from the surface out of the fluid can leave the sensor through at least one housing ventilation opening which is arranged in the lid or on an outer side of the inlet chamber at a height close to the lid.

However, it should be ensured that the lid is closed at least in the area of the measuring chamber. This prevents fluid from the area surrounding the sensor, which in high probability contains air bubbles, from directly entering the measuring chamber.

The pressure compensation in the measuring chamber is created in particular by the fact that on the outer side of the measuring chamber at a height close to the lid, in particular above the maximum measurable fluid level, at least one ventilation opening is included into the chambers outside of the measuring chamber.

The fluid level in the measuring chamber can be calculated from the run time ratio of the signal reflected on the surface of the fluid and on a calibration reflector. Here, the calibration reflector in the measuring chamber is preferably arranged below the minimum possible fluid level.

The profile of the chambers can differ from chamber to chamber. This depends, among other things, on the geometry of the installation site. Thus, the inlet chamber can for example comprise an essentially round profile, and the measuring chamber can comprise an essentially square profile.

The outer sides of the chambers which are arranged between the inlet chamber and the measuring chamber are in particular designed as walls which extend from the floor at the most to a height just below the minimum measurable fluid level of the measuring chamber. The fluid flows through the inlet opening into the inlet chamber. The inlet chamber fills up to the height of the outer side of the next chamber. Further fluid continues to flow through the inlet opening and literally washes over the wall into the next chamber, and so on. The air bubbles rise to the surface of the fluid during this time and disintegrate. The fluid in the chamber, e.g. an intermediate chamber, in front of the measuring chamber is then advantageously already free of bubbles.

In order to ensure that only bubble-free fluid is able to enter the measuring chamber from the intermediate chamber arranged in front of the measuring chamber, when the fluid level in the intermediate chamber increases, the height and length of the outer side of the intermediate chamber are dimensioned in such a manner that the fluid retention capacity of this intermediate chamber is greater than the retention capacity of the measuring chamber itself.

Alternatively, the outer side of the intermediate chambers which are arranged between the inlet chamber and the measuring chamber can extend from the floor to the lid. In order to enable the air which is formed from the disintegrating air bubbles to escape, at least one ventilation opening is arranged on the outer side of said chambers, in each case close to the lid. In order to enable the fluid to enter the measuring chamber from the inlet chamber, at least one opening to allow the fluid to flow in and out is arranged on each of these outer sides. This opening is located on the outer side at least of the chamber which is closest to the measuring chamber, between the floor and the lid at a height below the minimum measurable fluid level. In a similar manner to the embodiment described above, it is also the case here that the retention capacity of the chamber in front of the measuring chamber is greater than the retention capacity of the measuring chamber itself.

In a further variant, the outer sides of the chambers which are arranged between the inlet chamber and the measuring chamber are designed as walls which extend from the floor at least up to a height above the maximum measurable fluid level. In order to enable the fluid to flow from the inlet chamber into the measuring chamber, these outer sides of the chamber comprise at a height close to the floor of the housing one opening each to allow the fluid to flow in and out. In order to make the journey which the fluid has to cover during this process, and thus the time in which the fluid and the air bubbles can separate, as long as possible, the openings are arranged in such a manner that the openings which occur in sequence in the direction of the measuring chamber are positioned as far apart as possible from each other.

With a slightly varied version of the last embodiment of the sensor described, the walls of the chambers extend between the inlet chamber and the measuring chamber up to the lid. Ventilation openings close to the lid ensure that the necessary pressure compensation is provided into the inlet chamber or into the surrounding area.

In a further embodiment, at least one chamber is arranged at least partially around or in front of the measuring chamber. Furthermore, a separation device is provided between at least two chambers of such a design that the flow direction of the fluid on its journey from one chamber into the next chamber is pre-specified by the respective opening for inflow and outflow. Preferably, as a result, the flow direction of chambers which are arranged in sequence is reversed, and thus the flow journey of the fluid from the inlet opening of the inlet chamber to the measuring chamber is made as long as possible. This separation device can for example in particular be realized with a sensor consisting of concentrically arranged tubes by a separating web which runs radially within one chamber. The same separation effect can also be realized when in each case the outer sides of two successive chambers touch each other, at least at a point preferably above the entire height.

A further possibility of influencing the flow speed of the fluid is to attach interim webs within a chamber. The flow speed is then determined in particular by the profile and the attachment location of an interim opening located on the interim web. The interim opening is preferably arranged at a height close to the floor of the housing.

For embodiments with which the fluid is guided on the journey from one chamber into the next through openings close to the floor, the existing separation devices and interim webs must be higher than the maximum possible fluid level.

BRIEF DESCRIPTION OF THE DRAWINGS

Further features, advantages and details of the invention can be found in the following description, in which preferred exemplary embodiments are explained in greater detail with reference to the appended drawings, wherein.

DETAILED DESCRIPTION OF EXAMPLE EMBODIMENTS OF THE INVENTION

Figure 1:
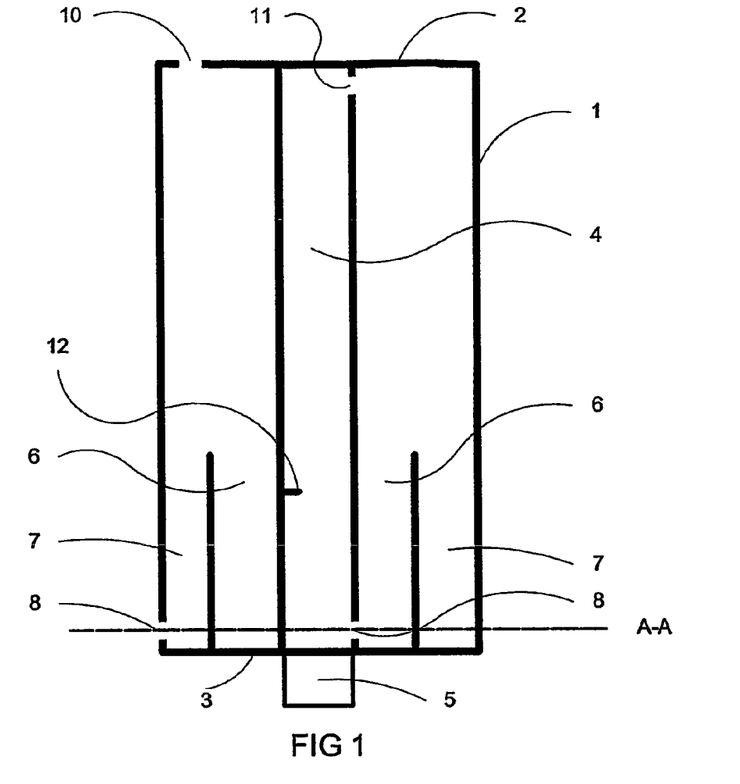
FIG. 1 shows a profile view of an ultrasound sensor with three chambers, without fluid
Figure 2:
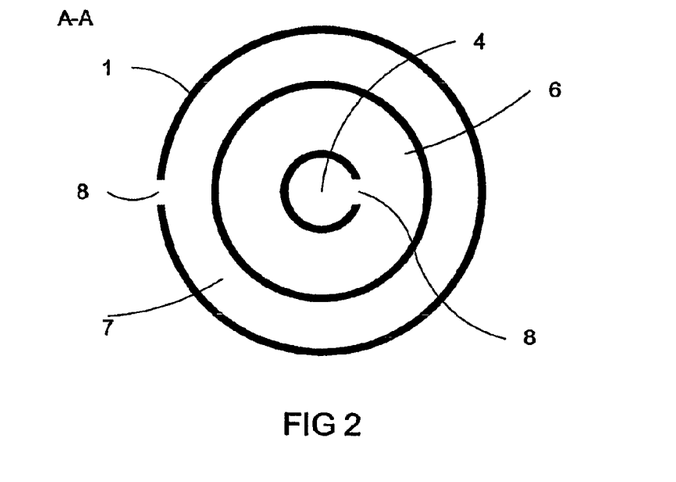
FIG. 2 shows a top view of the sensor in FIG. 1 at level A-A

An ultrasound sensor, briefly referred to as a sensor, will now be described below as it is used for example in automobiles for measuring the engine oil level. Here, the levels in the sensor and in the engine itself are identical, and the measuring range of the sensor generally lies between a minimum and a maximum value. FIG. 1 and FIG. 2 show a sensor with three chambers 4, 6, 7 including a measuring chamber 4 and additional chambers 6 and 7, without fluid. The cross-sectional profile is round and the individual chambers 4, 6, 7 are formed by concentrically arranged tubes. The outer tube ends with a floor 3 and a lid 2, and forms the housing 1 of the sensor. The middle tube extends from the floor 3 to the lid 2 and forms the measuring chamber 4. The outer chamber, also referred to as the inlet chamber 7, and the measuring chamber 4 each have on their respective outer side close to the floor 3 an opening 8 to enable the engine oil to flow in and out. The inlet chamber 7 and the measuring chamber 4 enclose therebetween a further intermediate chamber 6, wherein the outer side of the intermediate chamber 6 is formed by the inner side of the inlet chamber 7 and the inner side of the intermediate chamber 6 is formed by the measuring chamber 4. The outer side of the intermediate chamber 6 forms a wall which extends from the floor 3 until just below the minimum level to be measured. Outside the housing 1, on the floor in the region of the measuring chamber 4, an ultrasound transmission receiver 5 is attached.

After the first filling, the oil travels through the opening 8 close to the floor into the inlet chamber 7. The inlet chamber 7 fills up to the height of the outer side of the next chamber 6. If oil continues to flow through the opening 8, it literally washes over the wall into the next chamber 6. The air bubbles rise during this time to the surface of the oil and disintegrate. From the chamber 6, the oil travels through the opening 8 close to the floor into the measuring chamber 4.

Figure 3:
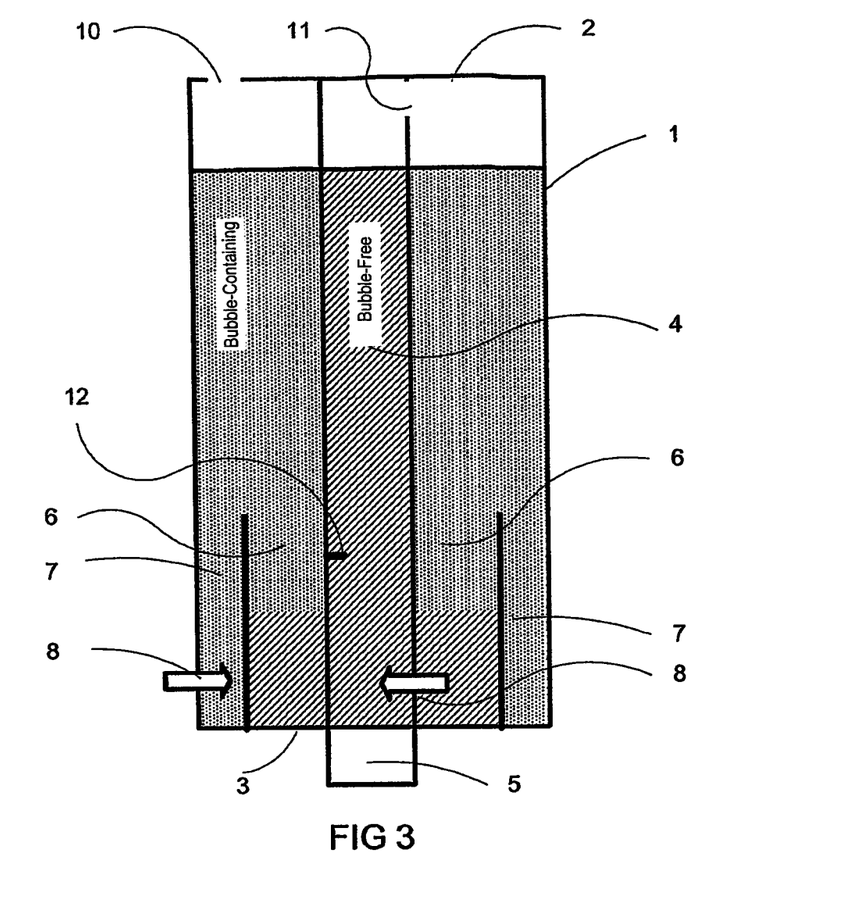
FIG. 3 shows a profile view as in FIG. 1, with fluid and the surrounding system, not in operation

FIG. 3 shows the relationships or overall conditions in the sensor in particular as they occur when the surrounding system, i.e. the engine, is not in operation. The oil in the measuring chamber 4 and also the oil in the important lower area of the intermediate chamber 6 which is positioned before it, are bubble-free. The air which escapes from the remaining oil can escape through a housing ventilation opening 10 in the edge area of the lid 2. The lid is closed in the area of the measuring chamber 4, as a result of which oil containing bubbles is prevented from penetrating directly into the measuring chamber 4 from the engine area. The housing ventilation opening 10 could then be provided on the outer side of the inlet chamber 7, preferably close to the lid 2.

Figure 4:
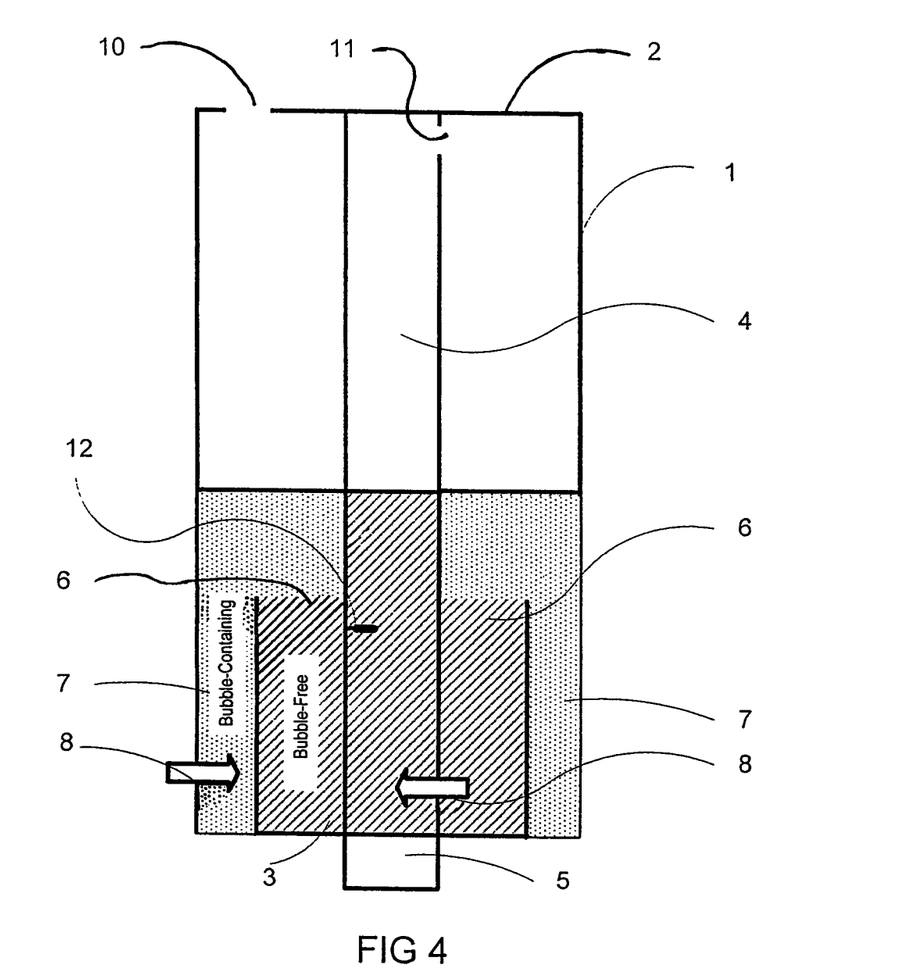
FIG. 4 shows a profile view as in FIG. 1, with fluid and surrounding system, in operation

FIG. 4 shows the relationships or overall conditions in the sensor which are possible when the engine is in operation. The oil is distributed through the moving parts such as the crankshaft and the connecting rod in the engine. As a result, the level in the oil pan, and therefore also in the sensor, decreases. The pressure fluctuations in the measuring chamber 4 which are caused by the changes in level are offset by the ventilation opening 11 close to the lid on the outer side of the measuring chamber. In the intermediate chamber 6 positioned in front of the measuring chamber 4, preferably only bubble-free oil is present. If oil flows on through the opening 8 of the outer housing 1 into the outer chamber or inlet chamber 7, then bubble-free oil is pressed into the measuring chamber 4 from the intermediate chamber 6. Due to the fact that in particular the retention capacity of the intermediate chamber 6 is greater due to the dimensioning of the height and length of the wall which surrounds said chamber 6 than that of the measuring chamber 4, it is ensured that with all possible changes in level, only bubble-free oil is present in the measuring chamber, because the bubble-free oil will be retained or stagnate in the measuring chamber 4 and the bubble-free retention capacity of the intermediate chamber 6 as the oil ebbs and flows back and forth into and out of the measuring chamber 4 due to changes in the oil level as represented in FIGS. 3 and 4. The measurement of the run time of the ultrasound signals which are transmitted by the ultrasound transmission receiver and which are reflected on the calibration reflector 12 or on the surface of the oil present in the measuring chamber 4 is thus advantageously not falsified at any point in time by air bubbles. The calibration reflector 12 mentioned is in particular formed on the inner side of the measuring chamber 4 below the minimum level to be measured.

Figure 5:
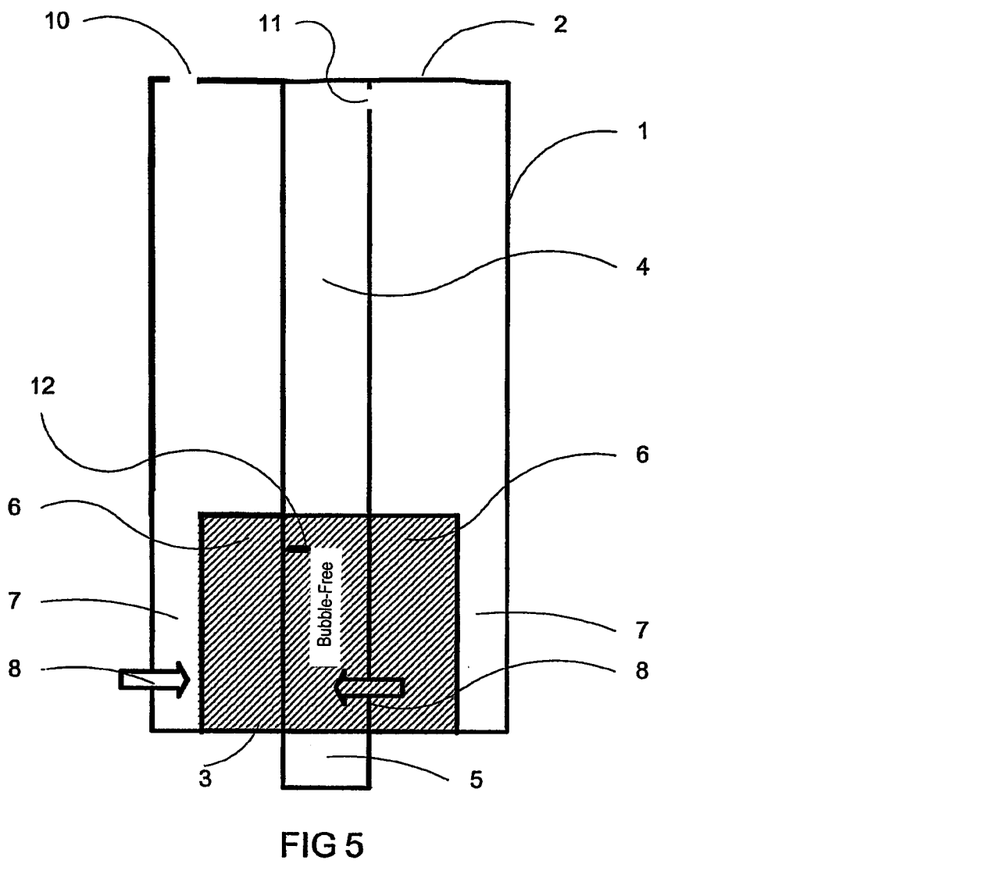
FIG. 5 shows a profile view as in FIG. 1, with fluid to a large extent drained

FIG. 5 shows the situation in which the oil is drained from the sensor and from the oil pan of the engine which occurs when oil is changed, for example. In the measuring chamber 4 and in the chamber 6 positioned in front of it, only bubble-free oil is present. After the oil pan, and thus also the sensor, has been re-filled, the measurement of the level can begin immediately.

Figure 6:
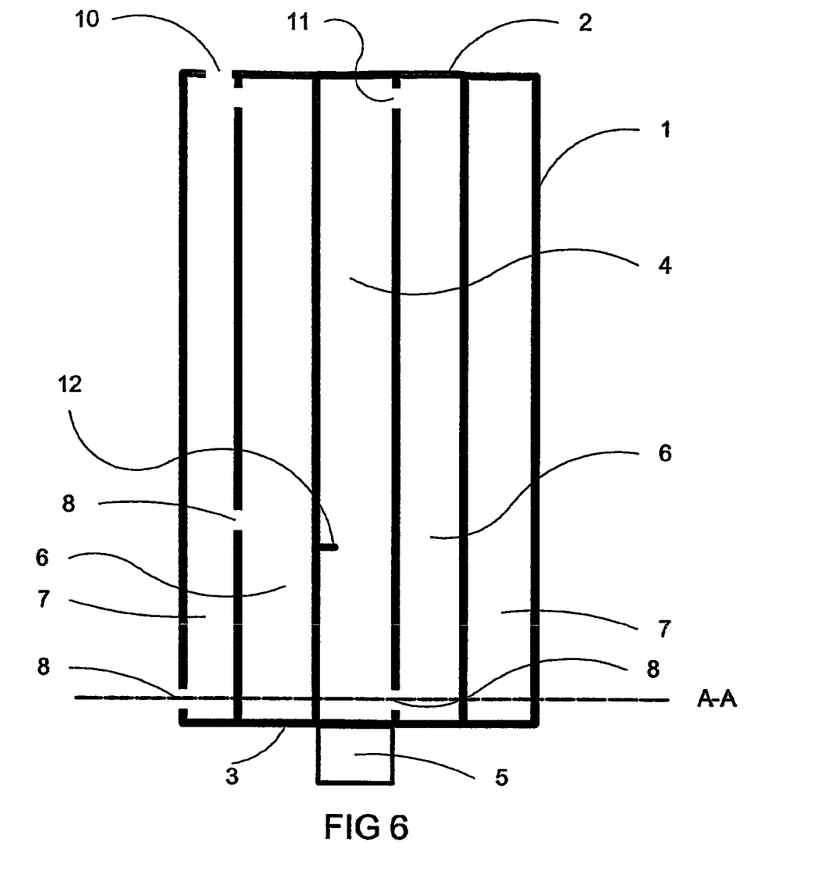
FIG. 6 shows a profile view as in FIG. 1, outer wall of the chamber in front of the measuring chamber up to the lid and the opening at a height below the minimum measurable fluid level

FIG. 6 shows a sensor as in FIGS. 1 to 5, with the difference that here, the outer side of the intermediate chamber 6 extends up to the lid 2. The oil travels from the inlet chamber 7 through an opening 8 into the intermediate chamber 6 at a height just below the minimum fluid level to be measured. The relative position of the openings 8 in the inlet chamber 7, the intermediate chamber 6 in front of it and the measuring chamber 4 is arbitrary with this embodiment in particular. The profile of the openings 8 and the number of openings 8 per chamber 4, 6, 7 can vary among each other, and influence the flow speed of the oil in the sensor. The ventilation opening 11 is arranged on the outer side of the intermediate chamber 6 close to the lid 2.

Figure 7:
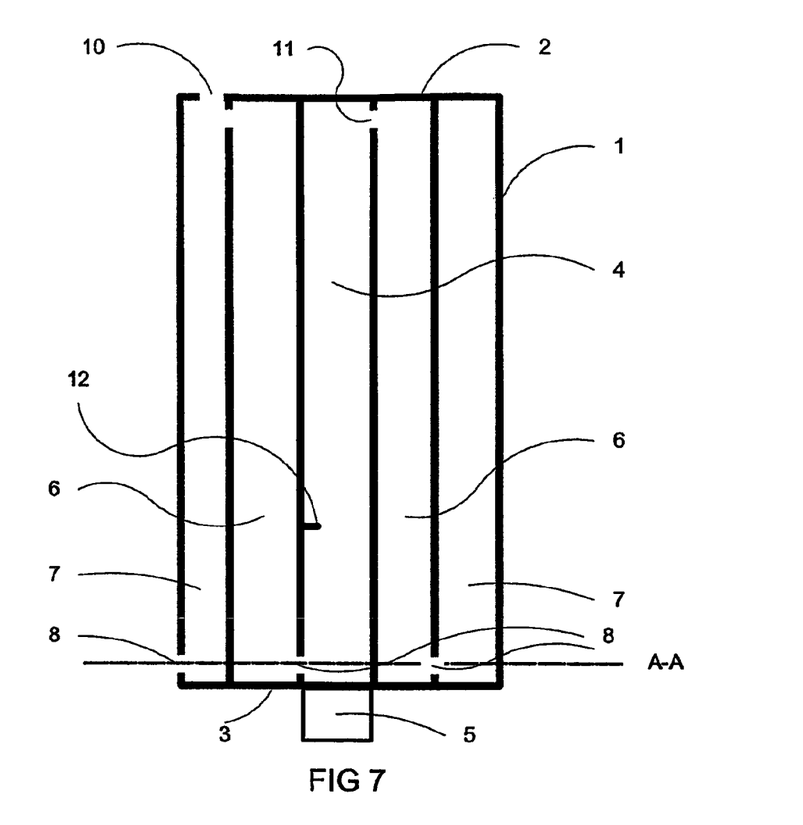
FIG. 7 shows a profile view as in FIG. 6, with the opening at a height close to the floor
Figure 8:
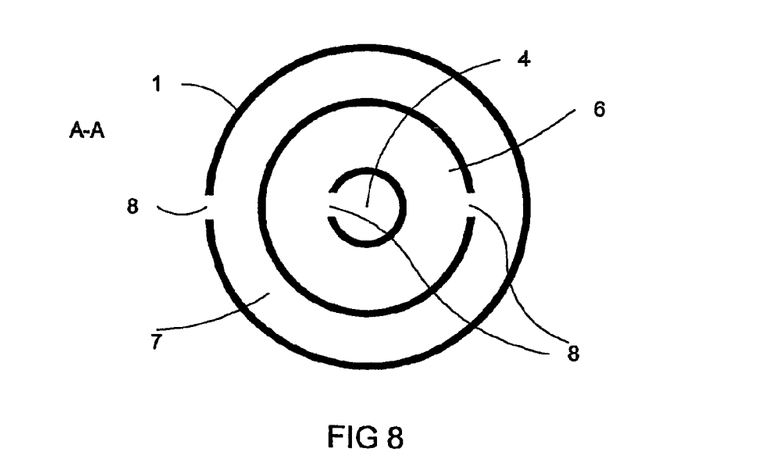
FIG. 8 shows a top view of the sensor from FIG. 7 at A-A level

FIGS. 7 and 8 show a further embodiment of the sensor. The openings 8 in the outer side of each chamber 4, 6, 7 are respectively arranged close to the floor 3. This has the advantage that when the oil is changed, possible residues such as oil sludge and fillings are to a large extent also flushed out. Preferably, the openings 8 which follow in succession in the direction of the measuring chamber 4 are positioned as far apart from each other as possible. As a result, the journey which the oil has to cover through to the measuring chamber 4 is as long as possible in this embodiment of the sensor. When it enters a chamber 7 or 6 the oil can however move towards the opening 8 into the next chamber 6 or 4 partially in a clockwise direction and partially in an anti-clockwise direction.

Figure 9:
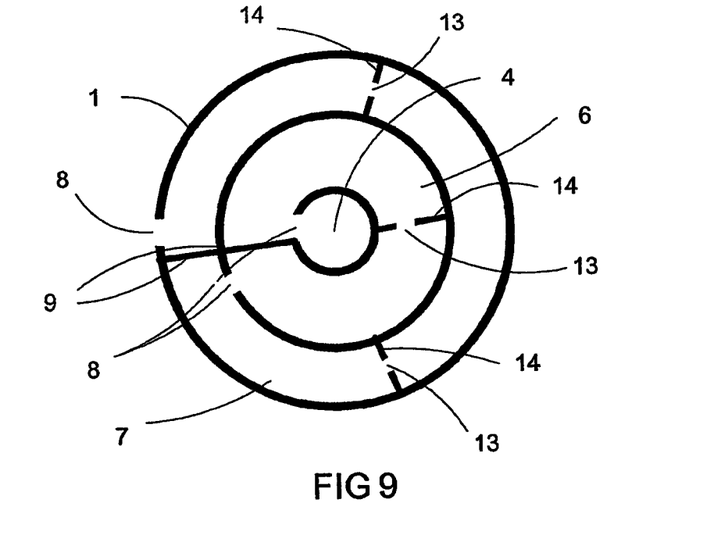
FIG. 9 shows a top view of a sensor at A-A level, with separation devices comprising webs, and interim webs

The time during which the oil lingers in a chamber 6, 7 can be prolonged by inserting a separation device 9, as shown in FIG. 9. The separation device 9 in the inlet chamber 7 lies to the right of the opening 8. As a result, in the inlet chamber 7, the flow direction into the next chamber 6 is pre-specified as being in a clockwise direction. The separation device 9 in the next chamber i.e. the intermediate chamber 6 lies to the left of the opening 8 into the intermediate chamber 6. Thus, in this second or intermediate chamber 6 the flow direction is pre-specified as being in an anti-clockwise direction. Due to the fact that the openings 8 and the separation devices 9 lie in the top view in a narrow angle range, and the separation devices 9 of two adjacent chambers 6, 7 lie in alternation to the left and right of the respective openings 8, in this example, the time and the flow path length which the oil requires from entering the inlet chamber 7 until it reaches the measuring chamber 4 is the longest. The arrangement of the separation devices 9 and the openings 8 can naturally vary from embodiment to embodiment. A separation device 9 can for example comprise a separating web which runs within a chamber 6, 7 from one wall to the other wall. The separation device 9 must in particular be higher than the maximum possible oil level. Preferably, the separation device 9 extends from the floor 3 to the lid 2. The flow speed can also be influenced by the arrangement of at least one interim web 14 within a chamber 6, 7. For the height of an interim web 14, the same applies as for the separation device 9. In contrast to the separation device 9, an interim web 14 can be permeated by the oil, however. For this purpose, an interim opening 13 is arranged in the interim web 14, preferably close to the floor. The number of interim webs 14 per chamber 6, 7 and the profile and number of the interim openings 13 can vary depending on requirements. In FIG. 9, two interim webs 14 are provided in the inlet chamber 7 and one interim web 14 is provided in the intermediate chamber 6. The openings 8 enable the oil to flow in and out, to and from a chamber 4, 6, 7 and the interim openings 13 are here positioned at one level in particular. This is not absolutely necessary, however.

Figure 10:
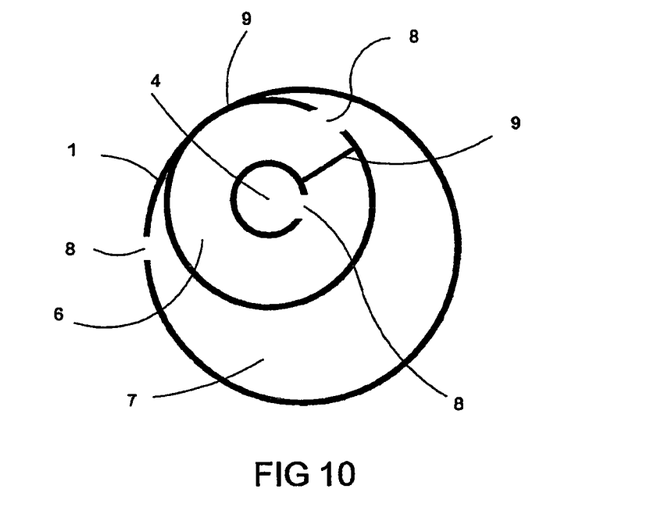
FIG. 10 shows a top view of a sensor at A-A level, with a first separation device comprising a web, and a further separation device

In FIG. 10, the separation device 9 in the inlet chamber 7 is formed by means of the fact that the outer sides of the successive inlet chamber 7 and chamber 6 touch each other at at least one point, here over a small part of the circumference. Also thereby the flow direction in the inlet chamber 7 is prescribed. In the intermediate chamber 6, another separation device 9 is provided by a web to the left next to the opening 8 into this chamber 6. The opening 8 into the intermediate chamber 6 does not have to lie at the same level as the opening 8 into the inlet chamber 7 or into the measuring chamber 4.

Figure 11:
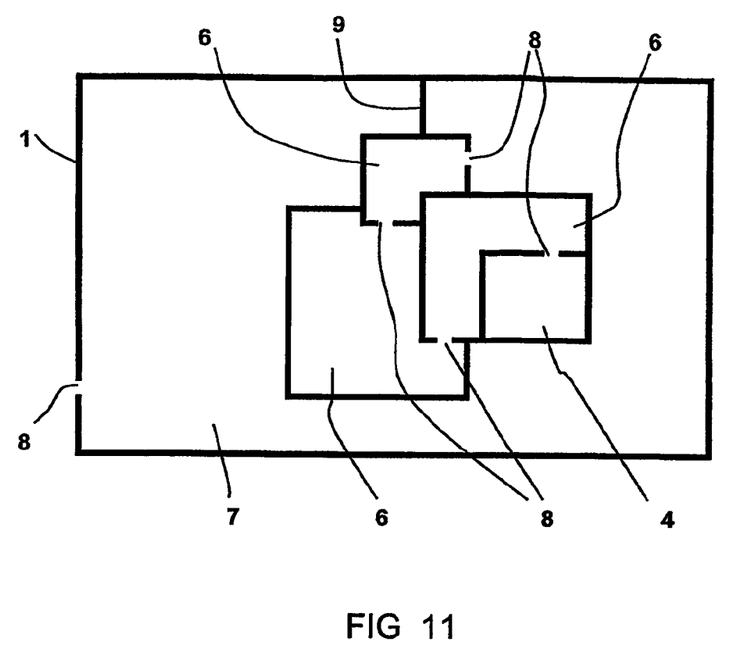
FIG. 11 shows a top view of a sensor at A-A level, with square profile and with a separation device in the inlet chamber, wherein chambers are at least partially arranged in front of and around the measuring chamber.

FIG. 11 shows a top view onto a sensor with a square profile. The inlet chamber 7 is arranged around the measuring chamber 4, and the plural (in this example three) intermediate chambers 6 are arranged at least partially in front of or around the measuring chamber 4.

The multi-chamber ultrasound sensor described guarantees a slowdown of the oil in the sensor and a bubble-free measuring chamber.

The present invention has been described with reference to the description provided in such a manner as to explain in the best possible manner the principle of the invention and its practical application. However, with appropriate modifications, the invention can naturally also be used in numerous other embodiments and combinations.

What is claimed is:

1. A fluid level measuring apparatus for measuring a fluid level of a fluid surface of a fluid, comprising
a measuring chamber enclosed within a measuring chamber wall;
at least one additional chamber, which is adapted to remove bubbles from the fluid therein, enclosed within a respective additional chamber wall, and arranged at least partially or entirely outwardly around the measuring chamber wall;
a respective flow opening respectively provided in the measuring chamber wall and in each respective additional chamber wall, wherein the chamber walls and the flow openings are configured and arranged to provide flow communication of the fluid constrained to flow along a fluid flow path from outside of the apparatus successively into and through the at least one additional chamber and from there into the measuring chamber such that a fluid level of a fluid surface of the fluid is the same in the measuring chamber and the at least one additional chamber and outside of the apparatus;
an ultrasound transducer inside or outside of the measuring chamber on a chamber floor bounding a bottom of the measuring chamber, wherein the ultrasound transducer is arranged and adapted to emit a sound signal that travels through the fluid in the measuring chamber, reflects from the fluid surface of the fluid in the measuring chamber and is then received back by the ultrasound transducer within a signal transit time, such that the fluid level can be determined from the signal transit time; and
a first separation device that is impermeable by the fluid and is arranged in a first additional chamber among the at least one additional chamber so as to fluid-impermeably divide and separate an inlet end of the first additional chamber from an outlet end of the first additional chamber respectively on opposite first and second sides of the first separation device;
wherein the respective flow opening along the fluid flow path entering the first additional chamber is located in the inlet end of the first additional chamber on the first side of the first separation device, and the respective flow opening along the fluid flow path leaving the first additional chamber toward the measuring chamber is located in the outlet end of the first additional chamber on the second side of the first separation device.

2. The fluid level measuring apparatus according to claim 1, wherein the first additional chamber is an outermost chamber forming an inlet chamber, into which the fluid flow path first enters from the outside of the apparatus.

3. The fluid level measuring apparatus according to claim 2, wherein the at least one additional chamber further includes an intermediate second additional chamber arranged between the first additional chamber and the measuring chamber.

4. The fluid level measuring apparatus according to claim 3, further comprising a second separation device that is impermeable by the fluid and is arranged in the second additional chamber so as to fluid-impermeably divide and separate an inlet end of the second additional chamber from an outlet end of the second additional chamber respectively on opposite first and second sides of the second separation device, wherein the respective flow opening along the fluid flow path entering the second additional chamber from the first additional chamber is located in the inlet end of the second additional chamber on the first side of the second separation device, and the respective flow opening along the fluid flow path leaving the second additional chamber toward the measuring chamber is located in the outlet end of the second additional chamber on the second side of the second separation device.

5. The fluid level measuring apparatus according to claim 4, wherein the first and second separation devices both lie on a single common plane as a continuous extension of one another.

6. The fluid level measuring apparatus according to claim 5, wherein the additional chamber walls and the measuring chamber wall are respective cylindrical shell walls arranged coaxially with respect to one another about a central axis of the apparatus, and the single common plane on which the first and second separation devices lie is a radial plane running along and radiating from the central axis.

7. The fluid level measuring apparatus according to claim 6, wherein all of the flow openings lie within an angular range of not more than 30° about the central axis on the respective opposite first and second sides of the separation devices.

8. The fluid level measuring apparatus according to claim 1, wherein the flow openings and the separation device are positioned to positively constrain the fluid flow path so that the fluid flow path extending from the flow opening in the inlet end of the first additional chamber to the flow opening in the outlet end of the first additional chamber must traverse at least about 270° around a center of the apparatus.

9. The fluid level measuring apparatus according to claim 1, wherein the flow openings and the separation device are positioned to positively constrain the fluid flow path so that the fluid flow path extending from the flow opening in the inlet end of the first additional chamber to the flow opening in the outlet end of the first additional chamber must traverse at least about 330° around a center of the apparatus.

10. The fluid level measuring apparatus according to claim 1, wherein the flow openings and the separation device are positioned to positively constrain the fluid flow path so that the fluid flow path entering the first additional chamber through the respective flow opening in the inlet end of the first additional chamber and the fluid flow path exiting from the first additional chamber through the respective flow opening in the outlet end of the first additional chamber must have respective fluid flow directions that are directed 180° opposite one another.

11. The fluid level measuring apparatus according to claim 1, wherein the flow openings and the separation device are positioned to positively constrain the fluid flow path so that the fluid flow path from the inlet end to the outlet end of the first additional chamber must traverse around a majority of the perimeter of the measuring chamber.

12. The fluid level measuring apparatus according to claim 1, wherein the separation device is arranged entirely internally within the apparatus and is not exposed externally outside of the apparatus, and the separation device is exposed to the fluid in the first additional chamber on both the first side and the second side of the separation device.

13. The fluid level measuring apparatus according to claim 1, wherein the first separation device is a planar separation wall.

14. The fluid level measuring apparatus according to claim 1, wherein the first separation device is formed by a junction of respective ones of the chamber walls.

15. The fluid level measuring apparatus according to claim 1, wherein the flow openings and the chambers are dimensioned and arranged so as to achieve a separation and removal of the bubbles that are present in the fluid entering the apparatus from outside of the apparatus as the fluid flows along the fluid flow path before the fluid reaches the measuring chamber, and wherein a shortest distance within the respective additional chamber from the respective flow opening in the inlet end to the respective flow opening in the outlet end thereof intersects the first separation device and is shorter than the fluid flow path in the respective additional chamber because the first separation device fluid-impermeably divides and separates the inlet end from the outlet end and thus blocks and constrains the fluid to flow along the fluid flow path which is longer than the shortest distance.

16. The fluid level measuring apparatus according to claim 1, in combination with the fluid contained in said measuring chamber and in said at least one additional chamber, wherein said fluid level measuring apparatus is an oil level sensor, said fluid is an oil, said at least one additional chamber includes an outermost inlet chamber and an intermediate chamber interposed along said flow path between said inlet chamber and said measuring chamber, said oil in said inlet chamber has bubbles therein, said oil in said measuring chamber is free of bubbles, and said oil in said intermediate chamber at least in an area thereof adjacent to said flow opening that passes from said intermediate chamber to said measuring chamber is free of bubbles.

17. The fluid level measuring apparatus according to claim 1, wherein among said at least one additional chamber a respective chamber that is adjacent to said measuring chamber has a first volume capacity, said measuring chamber has a second volume capacity, and said first volume capacity is greater than said second volume capacity.

18. The fluid level measuring apparatus according to claim 1, further comprising an interim web arranged in said first additional chamber at a location along said fluid flow path between said inlet end and said outlet end, wherein said interim web has an interim opening that allows communication of said fluid flow path through said interim opening through said interim web from said inlet end to said outlet end, and wherein said interim opening has a constricted flow cross-section smaller than a flow cross-section of said first additional chamber along said fluid flow path in said inlet end and in said outlet end.

19. The fluid level measuring apparatus according to claim 1, wherein said at least one additional chamber includes an inlet chamber and plural intermediate chambers, said inlet chamber is a first outermost one of said chambers along said fluid flow path from outside of the apparatus, and said plural intermediate chambers are arranged and communicated in succession one after another along said fluid flow path between said inlet chamber and said measuring chamber.

20. A fluid level measuring apparatus for removing bubbles from a fluid and measuring a fluid level of a fluid surface of the fluid from which bubbles have been removed, said apparatus comprising:
a first chamber having a first inlet and a first outlet;
a second chamber having a second inlet and a second outlet;
a measuring chamber having a measuring chamber inlet; and
an ultrasound transducer;
wherein:
said second chamber is arranged and configured at least partly outwardly around said measuring chamber;
said first chamber is arranged and configured at least partly outwardly around said second chamber and said measuring chamber;
said first inlet communicates with an outside of said apparatus, said first outlet communicates with said second inlet, and said second outlet communicates with said measuring chamber inlet to establish a fluid flow path constrained to flow in sequence from said outside via said first inlet into said first chamber, along said first chamber to said first outlet, via said first outlet and said second inlet into said second chamber, along said second chamber to said second outlet, and via said second outlet and said measuring chamber inlet to said measuring chamber;
said chambers are configured and adapted to receive the fluid flowing and stagnating along said fluid flow path, and said first and second chambers are configured to allow bubbles to escape and be removed from the fluid so that the fluid in and entering said measuring chamber is free of the bubbles;
said first chamber, said first inlet and said first outlet are configured so that said fluid flow path along said first chamber from said first inlet to said first outlet must traverse at least about 270° around a center of said apparatus or of said measuring chamber;
said second chamber, said second inlet and said second outlet are configured so that said fluid flow path along said second chamber from said second inlet to said second outlet must traverse at least about 270° around said center; and
said ultrasound transducer is arranged and configured to emit an ultrasound signal into the fluid in said measuring chamber so that the signal reflects from the fluid surface of the fluid in said measuring chamber and is then received back by said ultrasound transducer within a signal transit time, such that the fluid level of the fluid in said measuring chamber can be determined from the signal transit time.

\* \* \* \* \*